US011544464B1

(12) United States Patent
Leighton

(10) Patent No.: US 11,544,464 B1
(45) Date of Patent: Jan. 3, 2023

(54) METHOD FOR ASSESSING FACILITY RISKS WITH NATURAL LANGUAGE PROCESSING

(71) Applicant: Pharm3r, New York, NY (US)

(72) Inventor: Greg Leighton, Hammonds Plains (CA)

(73) Assignee: Pharm3r LLC, New York, NY (US)

( * ) Notice: Subject to any disclaimer, the term of this patent is extended or adjusted under 35 U.S.C. 154(b) by 432 days.

(21) Appl. No.: 16/850,922

(22) Filed: Apr. 16, 2020

(51) Int. Cl.

| | |
|---|---|
| ***G06F 40/289*** | (2020.01) |
| ***G06N 20/00*** | (2019.01) |
| ***G06Q 50/04*** | (2012.01) |
| ***G06Q 10/06*** | (2012.01) |
| ***G10L 13/027*** | (2013.01) |
| ***G10L 25/12*** | (2013.01) |

(52) U.S. Cl.
CPC .......... *G06F 40/289* (2020.01); *G06N 20/00* (2019.01); *G06Q 10/0635* (2013.01); *G06Q 10/06395* (2013.01); *G06Q 50/04* (2013.01); *G10L 13/027* (2013.01); *G10L 25/12* (2013.01)

(58) Field of Classification Search
CPC .. G06F 40/289; G06N 20/00; G06Q 10/0635; G06Q 10/06395; G06Q 50/04; G10L 25/12; G10L 13/027
See application file for complete search history.

(56) References Cited

U.S. PATENT DOCUMENTS 10,108,605 B1 10/2018 Leighton
2005/0071185 A1* 3/2005 Thompson ............ G06Q 10/10 705/317
2014/0337086 A1* 11/2014 Asenjo ................ H04L 41/0896 705/7.28
2014/0358576 A1* 12/2014 Hoffman ................ G16Z 99/00 705/2
2016/0275628 A1* 9/2016 Mishra .................. G06Q 50/04
2016/0300156 A1* 10/2016 Bowers .............. G06F 16/2465
2018/0341248 A1* 11/2018 Mehr ..................... B22F 10/00
2019/0026675 A1* 1/2019 McKibbin ........ G06Q 10/06393
2020/0142856 A1* 5/2020 Neelamana .......... G06K 9/6253
2020/0143302 A1* 5/2020 Beard ................ G05B 19/4063
2020/0166909 A1* 5/2020 Noone .................. G06N 20/00
2020/0185105 A1* 6/2020 Najmi ................... G16H 50/20
2020/0273046 A1* 8/2020 Biswas .................... G06N 3/08
2020/0334416 A1* 10/2020 Vianu ................... G06N 7/005

* cited by examiner

*Primary Examiner* — Mark Villena
(74) *Attorney, Agent, or Firm* — Polsinelli, P.C.

(57) ABSTRACT

The present technology pertains to a method and system for assessing risks associated with facilities, based on using natural language processing. For example, a method can include receiving a natural language input comprising at least one raw text document associated with a facility and generating a plurality of segmented sentences from the raw text documents. The plurality of segmented sentences can be provided as inputs to a machine learning model trained to classify an input segmented sentence over a pre-defined lexicon of pharmaceutical terminology. Each segmented sentence can be classified into one or more classes given by the pre-defined lexicon of pharmaceutical terminology. A secondary classification can be performed for each classified segmented sentence to generate a production issue label based on an analysis of the classified segmented sentence. From the secondary classifications for the classified segmented sentences, at least one production category score for the facility can be generated.

27 Claims, 3 Drawing Sheets

METHOD FOR ASSESSING FACILITY RISKS WITH NATURAL LANGUAGE PROCESSING

TECHNICAL FIELD

The disclosed technology pertains to a natural language processing method and system that assesses risks associated with facilities, and more particularly to a natural language processing method and system that extracts and synthesizes data from raw text documents in order to assess risks associated with facilities and the networks of facilities in which they are embedded.

BACKGROUND

Assessing the risks inherent in facilities, and the networks they are embedded in, is a challenging task. Pharmaceutical supply chains, for instance, have information about issues in production facilities spread across different types of documents from different sources. As individual production facilities are used to make different products for different companies, collating available data into something relevant for a particular facility or particular supply chain is a massive challenge. Without this information, companies, governments, and organizations are blind to some of the risks in manufacturing some of society's most essential products.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
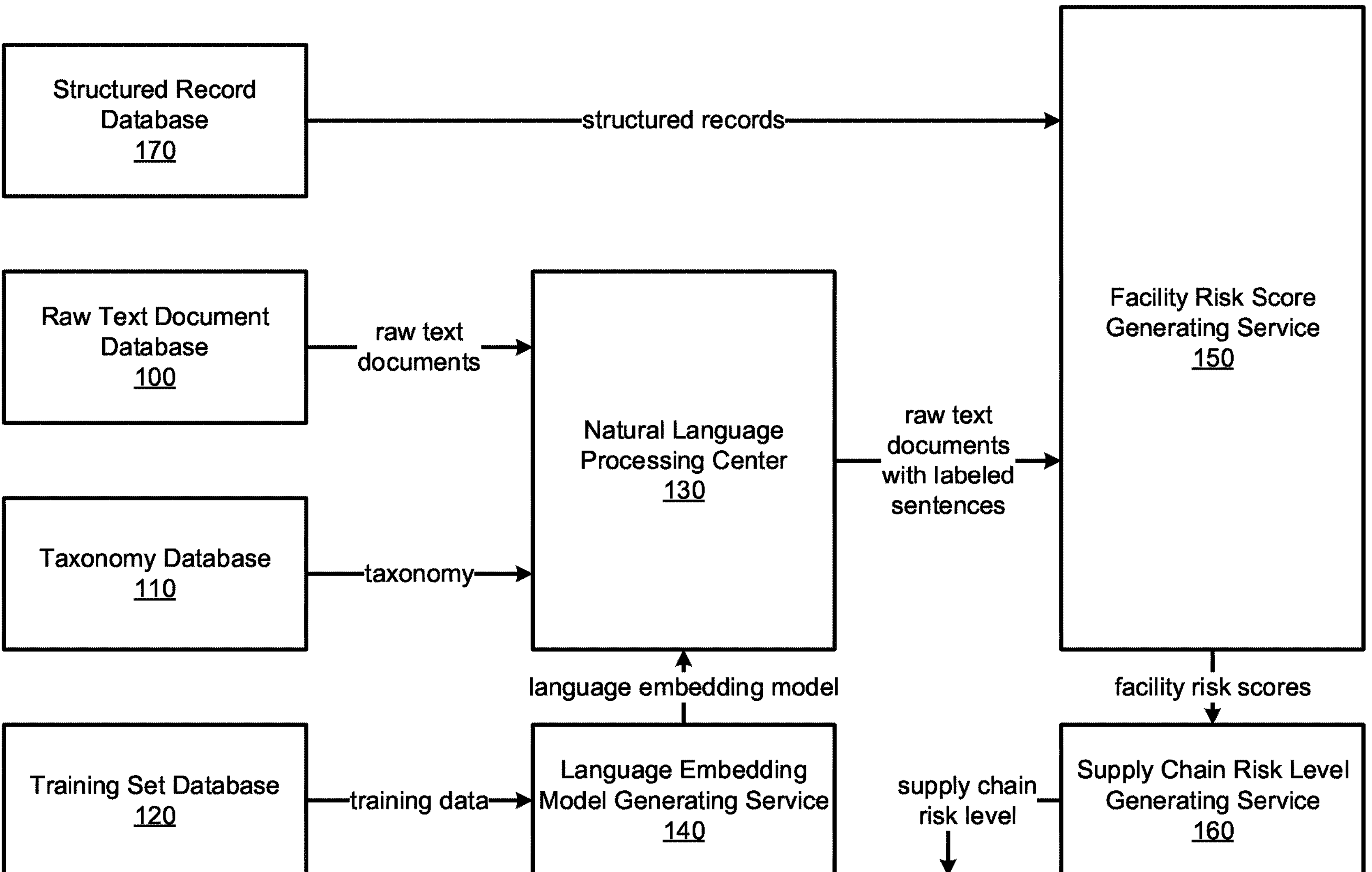
FIG. 1 illustrates an example configuration of devices in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

The present technology addresses the need in the art for an assessment of the risks in facilities and the networks in which they are embedded. As a motivating example, we consider the case of pharmaceutical production facilities and supply chains. Pharmaceuticals constitute a massive global industry, with yearly revenues exceeding a trillion dollars. The industry, enabled by global supply chains, provides life-saving drugs for countless people and jobs to many others.

As a result of this growth, pharmaceutical production has become increasingly distributed. The supply chains of the largest drug companies encompass several hundred facilities located across the globe, including "in-house" facilities owned by the company as well as "outsource" facilities operated by an external party. Many companies source key ingredients from the same facilities, meaning that a production issue at a single facility can have a dramatic impact on world-wide drug product safety and availability, and can potentially pose serious economic hazards to dozens of drug companies.

Currently, there is no single data source supplying unified supply chain data. This lack of centralized data means that assessing the impacts of production issues on supply chains is currently untenable. Instead, there are several sources providing partial information:

- Food & Drug Administration (FDA) drug establishment listings of approved manufacturing, labeling, and packaging facilities, each paired with unique FDA Establishment Identification (FEI) numbers;
- FDA National Drug Code (NDC) directories, which list marketed drug products by unique NDC numbers;
- structured product label (SPL) records submitted by labels, containing NDC numbers of drug products covered by the label, as well as FEI numbers and roles of facilities involved in their production;
- FDA Adverse Event Reporting System (FAERS), an FDA database containing drug adverse event reports;
- FDA facility inspection records, which contain decision codes containing information about future regulatory or administrative actions to be taken by the FDA;
- FDA warning letters issued to facilities, potentially identifying one or more production issues;
- FDA Form 483s issued to facilities, potentially identifying one or more production issues; and
- FDA drug recalls, potentially identifying one or more production issues leading to the recall, along with NDC numbers of the recalled products.

The present technology provides a software method that extracts and synthesizes the relevant information from various documents and presents it in a way that allows for stakeholders (including, but not limited to, regulators, lobbyists, company executives, hospitals, patients, pharmacists, healthcare practitioners, and watchdogs) to assess the risk level of production facilities in supply chains, as well as supply chains as a whole. This software method takes as input these various kinds of text documents, extracts and synthesizes relevant information about production issues, and generates analytics measuring the risks of production facilities.

FIG. 1 illustrates an example environment in accordance with some aspects of the present technology. A trained machine learning model can classify segmented sentences from raw text documents in a natural language processing center. In some embodiments, the trained machine learning model can comprise a language embedding model or other machine learning network trained to map the segmented sentences to a pre-defined lexicon of pharmaceutical terminology. Methods to generate this mapping can include the implementation of one or more neural networks, probabilistic models like naïve Bayes classifiers or logistic regressions, or other classification techniques. These classified segmented sentences can be labeled with production issue labels as a secondary classification and used to generate risk scores for facilities and risk levels for networks of facilities.

Text document database 100 stores raw text documents which are ultimately used as inputs into a trained machine learning model (or, in the context of the above example, a trained language embedding model). These text documents contain data regarding production issues at facilities in a pharmaceutical supply chain. The documents may include unstructured raw text documents of the types listed above, especially FDA warning letters, FDA drug recall documents, or FDA Form 483s. The documents can also include other documents issued by the FDA, or other types of documents issued by other governments, non-governmental organizations, or corporations. Text document database 100 can send the raw text documents it stores to natural language processing center 130.

Taxonomy database 110 can store a taxonomy which associates terms or natural language phases in the pre-defined lexicon of pharmaceutical terminology with secondary classifications. In some embodiments, the terms in the pre-defined lexicon of pharmaceutical terminology may be based on the Medical Dictionary for Regulatory Activities (MedDRA). MedDRA is a medical terminology dictionary and thesaurus used by regulators in the pharmaceutical industry with wide adoption internationally. MedDRA defines a variety of terms, one set of which are deemed "preferred terms." Of the levels of terms that MedDRA defines, preferred terms are the terms most commonly used for encoding medical terminology directly from text. A subset of preferred terms correspond to production issues in production facilities. In the taxonomy, these production-related preferred terms comprise the pre-defined lexicon of pharmaceutical terminology. In some embodiments, the pre-defined lexicon of pharmaceutical terminology can comprise the set over which the trained language embedding model classifies segmented sentences from the raw text documents. In some embodiments, the secondary classifications may be production issue categories, namely manufacturing, labeling, and packaging, which correspond to particular MedDRA preferred terms or other terms or natural language phrases from the pre-defined lexicon of pharmaceutical terminology.

In some embodiments, an example taxonomy can take the form of a table:

| MedDRA Preferred Term | Production Issue Label |
|---|---|
| PRODUCT CONTAMINATION | MANUFACTURING |
| PRODUCT TAMPERING | MANUFACTURING |
| PRODUCT TASTE ABNORMAL | MANUFACTURING |
| DRUG NAME CONFUSION | LABELING |
| PRODUCT LABEL ISSUE | LABELING |
| PRODUCT LABEL ON WRONG PRODUCT | LABELING |
| PRODUCT CONTAINER ISSUE | PACKAGING |
| PRODUCT PACKAGING ISSUE | PACKAGING |
| PRODUCT PACKAGING QUANTITY ISSUE | PACKAGING |

Training set database 120 contains datasets comprising natural language sentences corresponding to natural language phrases from the pre-defined lexicon of pharmaceutical terminology present in the taxonomy, such as the entries in MedDRA. Training set database 120 can send one or more datasets to language embedding model generating service 140. Datasets may be generated by an automated process or manually compiled.

In some embodiments, training data stored in training set database 120 can take the form of tuples associating phrases or sentences with their appropriate classification to one or more terms in MedDRA. For example, the tuples can be of the general form (sentence/sentence index, preferred term/classification), as illustrated in the examples below:

("Your firm released drug product in which the strength differs from, or its purity or quality falls below, that which it purports or is represented to possess.", product measured potency issue)

("Hazardous drugs were produced without providing adequate cleaning of utensils to prevent cross-contamination.", manufacturing equipment cleaning issue)

Language embedding model generating service 140 generates a language embedding model which can be trained to classify segmented sentences from raw text documents over the pre-defined lexicon of pharmaceutical terminology in the taxonomy, such as MedDRA preferred terms. A language embedding model is a model which maps segmented sentences (in this case) to vectors of real numbers, which are also known as embeddings. The mapping can be learned from training data, and features of the mapping can be learned through training as well. For instance, a language embedding model which uses a neural network would train on relevant data, learning relevant features and mapping segmented sentences to a real-numbered vector. The direction and magnitude of these output vectors determines the classification of a segmented sentence over the pre-defined lexicon of pharmaceutical terminology. For ambiguous output vectors, in some cases the model can determine multiple classifications for a segmented sentence.

Language embedding model generating service 140 can train the language embedding model on the datasets received from training set database 120. Methods to generate the language embedding model can include neural networks, probabilistic models like naïve Bayes classifiers or logistic regressions, or other classification techniques. Language embedding model generating service 140 can send the trained language embedding model to natural language processing center 130.

Natural language processing center 130 can receive a variety of inputs and can output raw text documents with labeled sentences. From text document database 100, it can receive raw text documents; from taxonomy database 110, it can receive the taxonomy; and from language embedding model generating service 140, it can receive a trained language embedding model. Natural language processing center 130 can segment the raw text documents and feed segmented sentences into the language embedding model, which will classify the segmented sentences over the pre-defined lexicon of pharmaceutical terminology in the taxonomy, such as MedDRA preferred terms.

Once classified over MedDRA preferred terms, natural language processing center 130 can take MedDRA preferred terms associated with each of the segmented sentences and, using the taxonomy, perform a secondary classification on the classified segmented sentences. In some embodiments, this involves labeling the segmented sentences with production issue labels, such as manufacturing, labeling, and packaging. Once each classified segmented sentence is labeled through the secondary classification process, natural language processing center 130 can associate these labels with the raw text document which yielded the sentences. Natural language processing center 130 can send the labeled raw text documents to facility risk score generating service 150.

In some embodiments, the processing pipeline of natural language processing center 130 can follow as such:

- A received PDF (.pdf) document is converted to a plain text (.txt) document
- The plain text document is fed into a sentence segmenter, which yields a list of tuples, each of which takes the form (sentence index, sentence text)
- The list of tuples is fed into the trained language embedding model, which yields a new list of tuples, each of which takes the form (sentence index, MedDRA preferred term)
- The new list of tuples is matched with the taxonomy, which yields a final list of tuples, each of which takes the form (sentence index, MedDRA preferred term, production issue label)

Facility risk score generating service 150 can receive raw text documents with labeled sentences and structured records and use that information to generate a risk score for an individual facility that the raw text documents pertain to. In one embodiment, the generation of a risk score can be based on a combination of production category scores (one for each of the production issue labels: manufacturing, labeling, and packaging) and inspection scores (generated from inspection reports in structured record database 170).

Structured records can be stored in structured record database 170. Unlike the raw text documents stored in raw text document database 100, structured records require no natural language processing due to the nature of the documents. While some structured records contain information pertaining to MedDRA preferred terms, FDA inspection records for facilities contain decision codes. An inspection record decision code can be one of: No Action Indicated (NAI), indicating no objectionable conditions are practices were found during the inspection; Voluntary Action Indicated (VAI), indicating objectionable conditions or practices were found but the FDA is not prepared to take or recommend any administrative or regulatory action; or Official Action Indicated (OAI), indicating regulatory or administrative actions will be recommended by the FDA.

In some embodiments, generating a production category score can proceed as follows:

- For a given secondary classification (such as manufacturing, labeling, and packaging), aggregating the labeled raw text documents pertaining to that secondary classification
- Taking each aggregated labeled raw text document, and associating it with a calendar quarter
- For each calendar quarter, counting the number of aggregated labeled raw text documents to yield quarterly production issue label counts
- Temporally ordering the quarterly production issue label counts
- Generating an exponential moving average of the quarterly production issue label counts
- Mapping the exponential moving average to a percentile rank relative to other facilities for the secondary classification The exponential moving averages of other facilities, against which the percentile rank for this facility's production category score is calculated, can be aggregated from past data received by facility risk score generating service 150, from multiple facilities referenced in the labeled raw text documents, or from outside sources.

In some embodiments, generating an inspection score can proceed as follows:

- Weighting the decision codes, where NAI receives a weight of 0, VAI receives a weight of 1, and OAI receives a weight of 2
- Taking each inspection record with its weighted decision code and associating it with a calendar quarter
- For each calendar quarter, summing the weights of the decision codes to yield quarterly weighted decision code scores
- Generating an exponential moving average of the quarterly weighted decision code scores
- Mapping the exponential moving average to a percentile rank relative to other facilities for the defined category The exponential moving averages of other facilities, against which the percentile rank for this facility's inspection score is calculated, can be aggregated from past data received by facility risk score generating service 150, from multiple facilities referenced in the inspection records, or from outside sources.

Once production category scores and inspection scores are generated for a given facility, facility risk score generating service 150 can generate a risk score for that facility. In addition to production category scores and the inspection score, factors such as geographic location, country, size of facility, or others can be used to generate a risk score.

In some embodiments, generating a risk score for a facility can proceed as follows:

- Weighting the production category scores by the quantity of products for which the facility serves a role in a given production category designated by a production issue label, such as manufacturing, labeling, or packaging
- Mapping the weighted sum of the production category scores and the inspection score to a percentile rank relative to other facilities The risk scores of other facilities, against which the percentile rank for this facility's inspection score is calculated, can be aggregated from past data received by facility risk score generating service 150, from multiple facilities referenced in the inspection records, or from outside sources.

Facility risk score generating service 150 can send facility risk scores to supply chain risk level generating service 160. Supply chain risk level generating service can generate risk levels for a supply chain comprising facilities that have risk scores.

In some embodiments, generating a risk level for a supply chain can proceed as follows:

- Weighting the risk scores for facilities in the supply chain by the percentage of products in the supply chain which are processed at that facility
- Mapping the weighted sum of the risk scores to a percentile rank relative to other supply chains The risk level of other supply chains, against which the percentile rank for this supply chain's risk level is calculated, can be aggregated from past data received by supply chain risk level generating service 160, from multiple facilities referenced in the inspection records, or from outside sources.

Supply chain risk level generating service 160 can send the risk level for a supply chain to any of a number of services. It can send it to a user interface for consumption by a regulator, executive, or other user. It can send it to a database of supply chain risk levels for future consumption.

Figure 2:
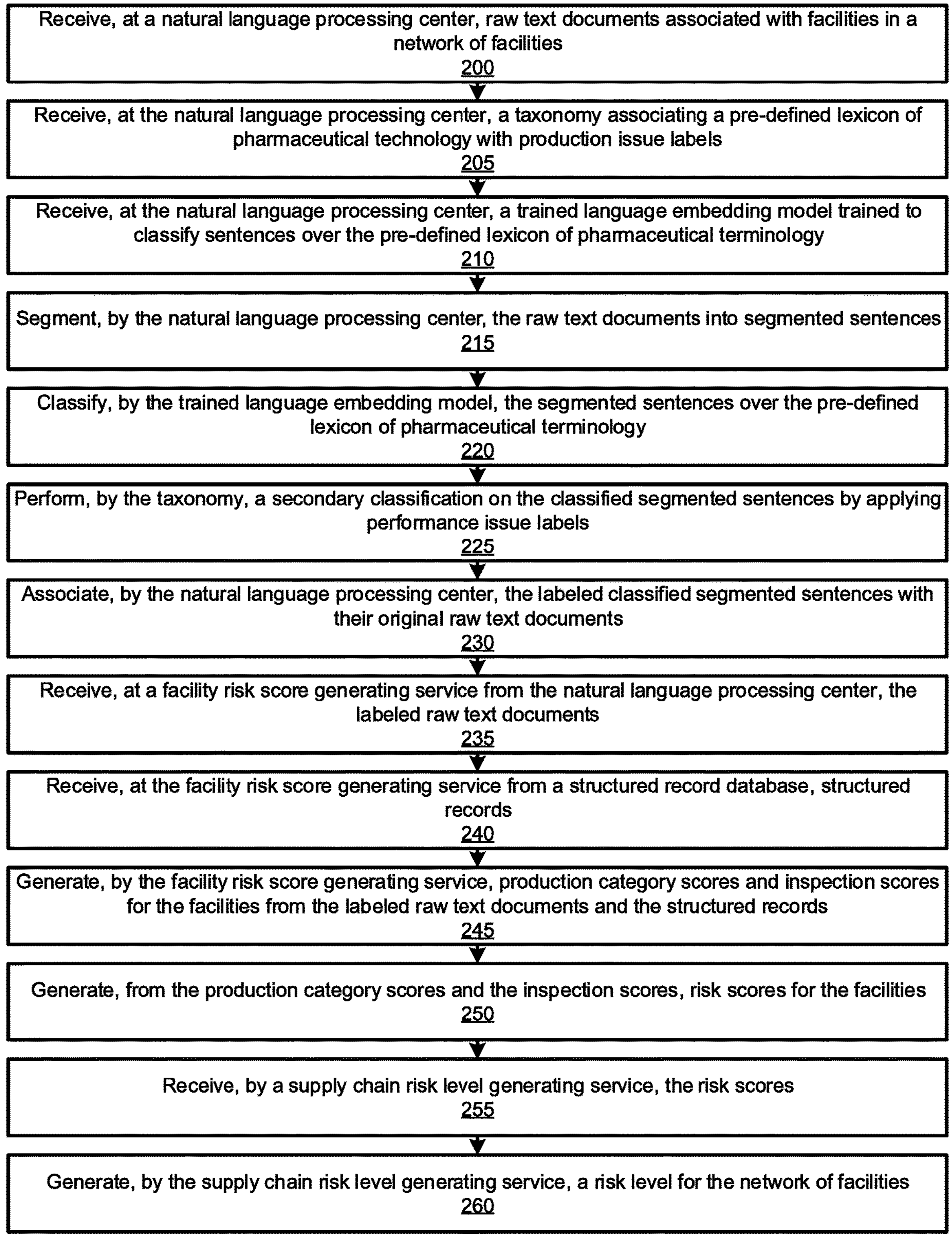
FIG. 2 illustrates an example method in accordance with some aspects of the present technology.

FIG. 2 illustrates an example method in accordance with some aspects of the present technology. The method classifies segmented sentences in raw text documents, labels those sentences with secondary classifications, and uses the labeled sentences to generate risk scores for facilities and risk levels for networks of facilities.

The method begins when natural language processing center 130 receives (200) raw text documents from text document database 100. These documents are associated with facilities, and these facilities can be associated with a broader network of facilities, such as a pharmaceutical supply chain. In some embodiments, the raw text documents can be any of a warning letter, a drug recall document, or an FDA Form 483.

Natural language processing center 130 receives (205) a taxonomy associating a pre-defined lexicon of pharmaceutical terminology with production issue labels from taxonomy database 110. In some embodiments, the pre-defined lexicon of pharmaceutical terminology can be preferred terms taken from MedDRA, while the secondary classifications can be manufacturing, labeling, and packaging. The taxonomy can be compiled manually, or derived algorithmically from other sources.

Natural language processing center 130 receives (210) a trained language embedding model trained to classify sentences over the pre-defined lexicon of pharmaceutical terminology present in the taxonomy from language embedding model generating service 140. Methods to generate the language embedding model can include neural networks, probabilistic models like naïve Bayes classifiers or logistic regressions, or other classification techniques.

Natural language processing center 130 segments (215) the raw text documents into segmented sentences. It then feeds these segmented sentences into the language embedding model as inputs, which classifies (220) the segmented sentences over the pre-defined lexicon of pharmaceutical terminology, such as MedDRA. In some embodiments, the segmented sentences may be classified by more than one term in the pre-defined lexicon of pharmaceutical terminology, which in some embodiments will yield multiple classifications, and in others the language embedding model will resolve the multiplicity to yield only a single classification for each segmented sentence. Once classified, natural language processing center 130 performs (225) via the taxonomy a secondary classification on the classified segmented sentences by labeling them with production issue labels corresponding to the terms or natural language phrases in the pre-defined lexicon of pharmaceutical terminology. If a segmented sentence has multiple classifications, it can also yield multiple labelings.

Natural language processing center 130 associates (230) the labeled classified segmented sentences with the raw text documents from which they came. It can then send these data to facility risk score generating service 150, which receives (235) the data. Facility risk score generating service 150 also receives (240) structured records, including inspection records, from structured record document database 170. These documents do not require natural language processing, and thus do not need to pass through natural language processing center 130. From the received data, facility risk score generating service 150 generates (245) production category scores and inspection scores for each facility mentioned in the raw text documents and inspection records. With these production category scores and inspection scores, facility risk score generating service generates (250) risk scores for the facilities referenced in the raw text documents, including the inspection records. In some embodiments, the production category scores, inspection scores, and risk scores can be generated according to the processes delineated in the description of FIG. 1.

Facility risk score generating service 150 sends the risk scores for the facilities to supply chain risk level generating service 160, which receives (255) the risk scores. From the risk scores, supply chain risk level generating service 160 generates a risk level (260) for a network of related facilities, such as a supply chain. In some embodiments, the risk level can be generated according to the processes delineated in the description of FIG. 1.

Figure 3:
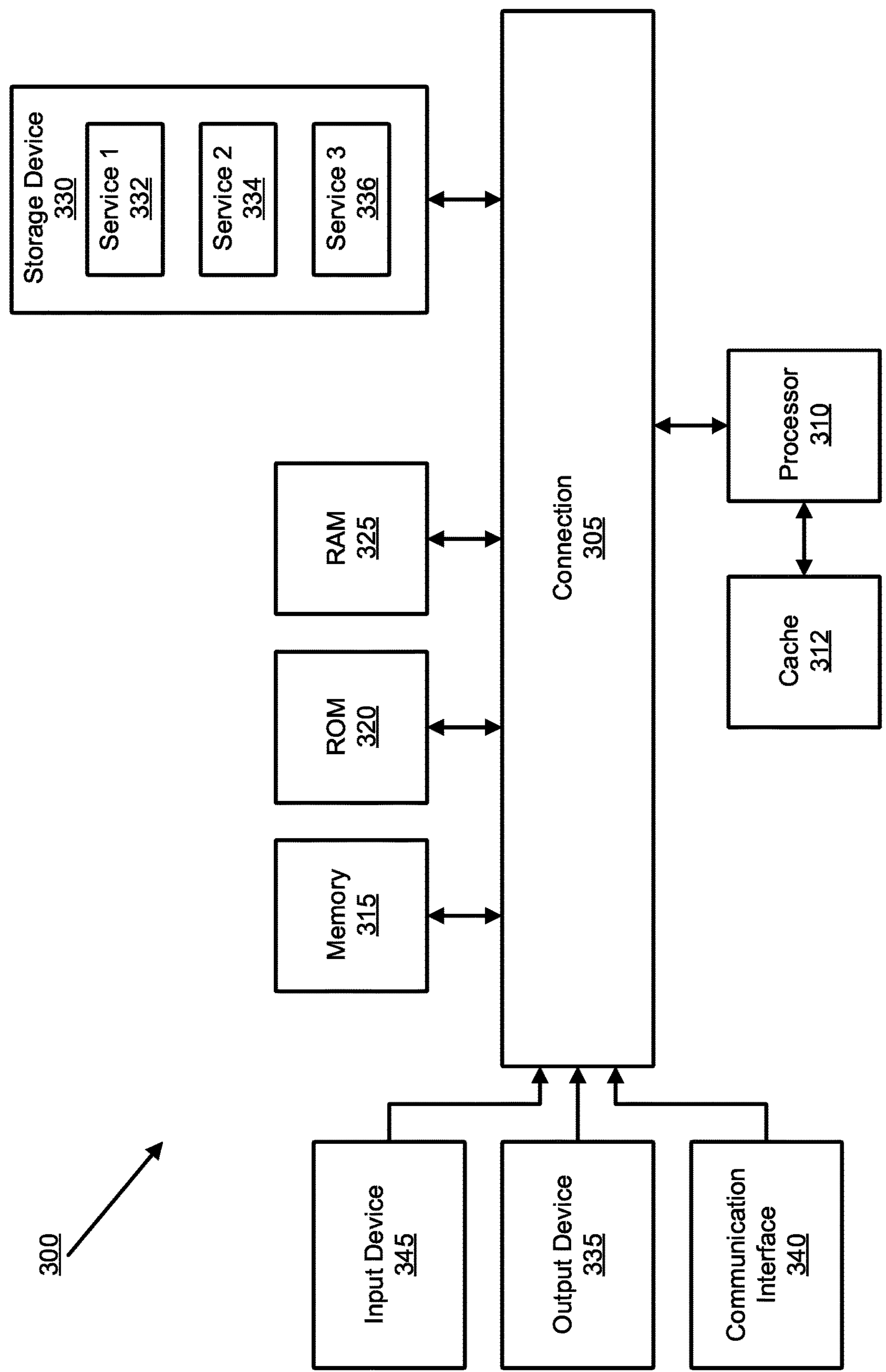
FIG. 3 illustrates an example system embodiment in accordance with some aspects of the present technology.

FIG. 3 shows an example of computing system 300, which can be for example any computing device making up natural language processing center 130 or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:

receiving a natural language input, the natural language input comprising at least one raw text document associated with a facility;

generating, from each raw text document in the natural language input, a plurality of segmented sentences;

providing the plurality of segmented sentences as inputs to a machine learning model, wherein the machine learning model is trained to classify an input segmented sentence over a pre-defined lexicon of pharmaceutical terminology;

classifying, by the trained machine learning model, each segmented sentence of the plurality of segmented sentences into one or more classes given by the pre-defined lexicon of pharmaceutical terminology;

performing a secondary classification for each classified segmented sentence, wherein the secondary classification generates a production issue label based on an analysis of the classified segmented sentence; and generating, from the production issue labels for the classified segmented sentences, at least one production category score for the facility, wherein generating the at least one production category score for each secondary classification comprises:

generating at least one quarterly production issue label count, wherein the at least one quarterly production issue label counts are associated with a calendar quarter;

normalizing the at least one quarterly production issue label counts;

generating an exponential moving average from the at least one normalized quarterly production issue label counts; and mapping the exponential moving average to a secondary classification score, wherein the production category score is a percentile rank of the exponential moving average.

2. The method of claim 1, wherein the at least one raw text documents in the natural language input are one of a warning letter, a drug recall document, or an FDA Form 483.

3. The method of claim 1, wherein the machine learning model is a language embedding model.

4. The method of claim 1, wherein the pre-defined lexicon of pharmaceutical terminology is taken from the Medical Dictionary for Regulatory Activities (MedDRA).

5. The method of claim 1, wherein the production issue labels comprise manufacturing, labeling, and packaging.

6. The method of claim 1, wherein classifying each segmented sentence using the trained machine learning model comprises labeling the segmented sentence with one or more terms from the pre-defined lexicon of pharmaceutical terminology, and wherein the one or more classes comprise the one or more terms.

7. The method of claim 6, wherein performing the secondary classification for each classified segmented sentence comprises an analysis of the one or more terms from the pre-defined lexicon of pharmaceutical terminology used to label the classified segmented sentences.

8. The method of claim 1, wherein generating the at least one production category score for the facility comprises using at least one structured record.

9. The method of claim 8, wherein the at least one structured record is one of a Food & Drug administration (FDA) drug establishment listing, an FDA National Drug Code (NDC) directory, a structured product label record, or an FDA Adverse Event Reporting System (FAERS).

10. The method of claim 1, further comprising:

generating, from at least one inspection record, an inspection score for the facility; and generating, from the at least one production category scores and the inspection score, a risk score for the facility.

11. The method of claim 10, wherein generating the inspection score for the facility comprises:

weighting decision codes from the at least one inspection records;

generating at least one quarterly weighted decision code score, wherein the at least one quarterly weighted decision codes are associated with a calendar quarter;

generating an exponential moving average from the at least one quarterly weighted decision code scores; and mapping the exponential moving average to the inspection score, wherein the inspection score is a percentile rank of the exponential moving average.

12. The method of claim 10, wherein generating the risk score for the facility comprises:

weighting the at least one production category scores by a secondary classification level; and mapping the at least one weighted production category scores and the inspection score to the risk score, wherein the risk score is a percentile rank of a sum of the at least one weighted production category scores and the inspection score.

13. The method of claim 10, further comprising:

aggregating risk scores for at least one facilities, wherein the at least one facilities are in a network of facilities; and generating, from the risk scores, a risk level for the network of facilities.

14. The method of claim 13, wherein generating the risk level for the network of facilities comprises:

weighting the at least one risk scores by a facility level; and mapping the at least one weighted risk scores to the risk level, wherein the risk level is a percentile rank of a sum of the at least one weighted risk scores.

15. A system comprising:

at least one processor; and a computer-readable storage medium having stored therein instructions which, when executed by the at least one processors, cause the at least one processors to perform operations comprising:

receiving a natural language input, the natural language input comprising at least one raw text document associated with a facility;

generating, from each raw text document in the natural language input, a plurality of segmented sentences;

providing the plurality of segmented sentences as inputs to a machine learning model, wherein the machine learning model is trained to classify an input segmented sentence over a pre-defined lexicon of pharmaceutical terminology;

classifying, by the trained machine learning model, each segmented sentence of the plurality of segmented sentences into one or more classes given by the pre-defined lexicon of pharmaceutical terminology;

performing a secondary classification for each classified segmented sentence, wherein the secondary classification generates a production issue label based on an analysis of the classified segmented sentence;

generating, from the production issue labels for the classified segmented sentences, at least one production category score for the facility;

generating, from at least one inspection record, an inspection score for the facility by:

generating at least one quarterly weighted decision code score based on weighting decision codes using the at least one inspection record;

generating an exponential moving average from the at least one quarterly weighted decision code scores; and mapping the exponential moving average to the inspection score, wherein the inspection score is a percentile rank of the exponential moving average; and generating, from the at least one production category scores and the inspection score, a risk score for the facility.

16. The system of claim 15, wherein the at least one raw text documents in the natural language input are one of a warning letter, a drug recall document, or an FDA Form 483.

17. The system of claim 15, wherein the machine learning model is a language embedding model.

18. The system of claim 15, wherein the pre-defined lexicon of pharmaceutical terminology is taken from the Medical Dictionary for Regulatory Activities (MedDRA).

19. The system of claim 15, wherein the production issue labels comprise manufacturing, labeling, and packaging.

20. The system of claim 15, wherein the instructions for classifying each segmented sentence using the trained machine learning model comprise labeling the segmented sentence with one or more terms from the pre-defined lexicon of pharmaceutical terminology, and wherein the one or more classes comprise the one or more terms.

21. The system of claim 20, wherein the instructions for performing the secondary classification for each classified segmented sentence comprise an analysis of the one or more terms from the pre-defined lexicon of pharmaceutical terminology used to label the classified segmented sentences.

22. The system of claim 15, wherein, for each secondary classification, the instructions for generating the at least one production category scores for the facility comprise:

generating at least one quarterly production issue label count, wherein the at least one quarterly production issue label counts are associated with a calendar quarter;

normalizing the at least one quarterly production issue label counts;

generating an exponential moving average from the at least one normalized quarterly production issue label counts; and mapping the exponential moving average to a production category score, wherein the production category score is a percentile rank of the exponential moving average.

23. The system of claim 15, wherein the instructions for generating the at least one production category scores for the facility comprise using at least one structured record.

24. The system of claim 23, wherein the at least one structured record is one of a Food & Drug administration (FDA) drug establishment listing, an FDA National Drug Code (NDC) directory, a structured product label record, or an FDA Adverse Event Reporting System (FAERS).

25. The system of claim 15, wherein the instructions for generating the risk score for the facility comprise:

weighting the at least one production category scores by a secondary classification level; and mapping the at least one weighted production category scores and the inspection score to the risk score, wherein the risk score is a percentile rank of a sum of the at least one weighted production category scores and the inspection score.

26. The system of claim 15, wherein the instructions further comprise:

aggregating at least one risk scores for at least one facilities, wherein the at least one facilities are in a network of facilities; and generating, from the at least one risk scores, a risk level for the network of facilities.

27. The system of claim 26, wherein the instructions for generating the risk level for the network of facilities comprise:

weighting the at least one risk scores by a facility level; and mapping the at least one weighted risk scores to the risk level, wherein the risk level is a percentile rank of a sum of the at least one weighted risk scores.

* * * * *